United States Patent
Cobb et al.

(10) Patent No.: US 10,137,580 B1
(45) Date of Patent: Nov. 27, 2018

(54) SYSTEMS AND METHODS FOR ROBOTIC ARM GUARD ASSEMBLIES

(71) Applicant: Honda Motor Co., Ltd., Tokyo (JP)

(72) Inventors: Derrick Ian Cobb, Delaware, OH (US); Richard Wolfgang Geary, Hilliard, OH (US); David Bryan Betz, West Jefferson, OH (US); Eric C. Baker, Saint Marys, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/706,201

(22) Filed: Sep. 15, 2017

(51) Int. Cl.
  *B25J 19/06* (2006.01)

(52) U.S. Cl.
  CPC ..... *B25J 19/06* (2013.01); *G05B 2219/40199* (2013.01); *G05B 2219/40202* (2013.01); *Y10S 901/49* (2013.01)

(58) Field of Classification Search
  CPC ........ B25J 9/142; B25J 15/0023; B25J 15/12; B25J 19/06; B25J 19/063; B25J 19/068; B65G 47/908; B66C 1/46; G05B 2219/40199; G05B 2219/40202; Y10S 901/49
  USPC ................................. 294/119.3, 213; 901/49
  See application file for complete search history.

(56) References Cited

U.S. PATENT DOCUMENTS

| | | | | |
|---|---|---|---|---|
| 3,343,864 A | * | 9/1967 | Baer | B25J 15/0009 294/119.3 |
| 3,601,442 A | * | 8/1971 | Orndorff | B25J 15/0023 294/119.3 |
| 3,640,564 A | * | 2/1972 | Kuster | B25B 11/00 294/112 |
| 4,469,100 A | * | 9/1984 | Hardwick | A61B 17/22032 604/908 |

(Continued)

FOREIGN PATENT DOCUMENTS

| | | |
|---|---|---|
| DE | 102008004037 A1 | 7/2009 |
| DE | 102014221645 A1 | 4/2014 |

(Continued)

OTHER PUBLICATIONS

Harnel, Kurt, "Review: Shopbot Desktop Max Gives Pro CNC Router Quality for a Price," Makezine.com, May 9, 2017, available at <https://makezine.com/2017/05/09/shopbot-desktop-max-review/>.

*Primary Examiner* — Dean J Kramer
(74) *Attorney, Agent, or Firm* — Armstrong Teasdale LLP

(57) ABSTRACT

A robotic system includes a robotic arm assembly and a guard assembly. The robotic arm assembly includes a robotic arm and an end effector that is coupled to the robotic arm and selectively couples to a moveable object. The guard assembly is selectively moveable between an open configuration and a closed configuration, and includes a plurality of guard petals that selectively move between a retracted configuration and an extended configuration. Each guard petal includes a flexible support structure and a fluid bladder (Continued)

coupled to the flexible support structure. The fluid bladder is selectively filled with a fluid to change the fluid bladder between a relaxed configuration and an expanded configuration. The fluid bladder is configured to wrap the flexible support structure around at least a portion of the moveable object when the guard petal is in the extended configuration and the fluid bladder is in the expanded configuration.

19 Claims, 10 Drawing Sheets

(56) References Cited

U.S. PATENT DOCUMENTS

| | | | | |
|---|---|---|---|---|
| 5,245,885 | A * | 9/1993 | Robertson | B25J 15/0009 |
| | | | | 294/119.3 |
| 5,833,291 | A * | 11/1998 | Haugs | A61G 7/001 |
| | | | | 294/119.3 |
| 6,484,601 | B1 * | 11/2002 | Arrichiello | B25J 9/14 |
| | | | | 294/106 |
| 6,543,307 | B2 * | 4/2003 | Ambrose | B25J 19/0025 |
| | | | | 74/490.01 |
| 6,655,637 | B1 * | 12/2003 | Robinson | B64G 1/007 |
| | | | | 244/172.4 |
| 7,258,379 | B2 * | 8/2007 | Ono | B25J 9/142 |
| | | | | 294/119.3 |
| 8,240,730 | B2 * | 8/2012 | Schaller | B25J 15/0023 |
| | | | | 294/119.3 |
| 2013/0232918 | A1 * | 9/2013 | Lomerson, Jr. | B25J 15/0052 |
| | | | | 53/452 |
| 2016/0257005 | A1 | 9/2016 | Werner et al. | |
| 2017/0036355 | A1 * | 2/2017 | Lessing | B25J 15/12 |

FOREIGN PATENT DOCUMENTS

| | | | | |
|---|---|---|---|---|
| DE | 102012217764 A1 | | 6/2014 | |
| EP | 1810795 A1 * | | 7/2007 | B25J 19/063 |
| WO | 201706732 A1 | | 3/2017 | |
| WO | 2017036690 A1 | | 3/2017 | |
| WO | WO-2017158120 A1 * | | 9/2017 | B25J 15/00 |

* cited by examiner

SYSTEMS AND METHODS FOR ROBOTIC ARM GUARD ASSEMBLIES

BACKGROUND

The field of the disclosure relates generally to protection assemblies for robotic systems, and more specifically, to guard assemblies for robotic arms for enhancing safety during operation.

Robotic arms and other robotic assemblies are mechanical devices operated by a computing device to perform mechanical tasks, such as picking up an object and moving the object to a destination location. In particular, robotic arms are used in industrial environments, such as assembly lines, to perform preprogrammed tasks during operation. The robotic arms may provide improved strength, improved accuracy, improved consistency, improved speed, increased duration of operation, and/or other benefits relative to human workers performing the same tasks. In at least some examples, human workers perform other tasks around the robotic arms. For example, a worker may be assigned to inspect components on the assembly line to identify faulty components, or the worker may be assigned to monitor and/or control the robotic arms.

In some known systems, robotic arms are used to move objects in areas near humans. Typically the robotic arms are positioned behind a fence or within a cage to ensure there is no contact between the robotic arm, including its load, and a human operator. Other industrial environments provide visual indication of the operational range of the robotic arms (e.g., lines painted on the ground around the robotic arm). However, some industrial environments and/or potential processes would benefit from an alternative safety mechanism.

BRIEF DESCRIPTION

In one aspect, a robotic system includes a robotic arm assembly and a guard assembly. The robotic arm assembly includes a robotic arm and an end effector that is coupled to the robotic arm and selectively couples to a moveable object. The guard assembly is selectively moveable between an open configuration and a closed configuration, and includes a plurality of guard petals that selectively move between a retracted configuration and an extended configuration. Each guard petal includes a flexible support structure and a fluid bladder coupled to the flexible support structure. The fluid bladder is selectively filled with a fluid to change the fluid bladder between a relaxed configuration and an expanded configuration. The fluid bladder is configured to wrap the flexible support structure around at least a portion of the moveable object when the guard petal is in the extended configuration and the fluid bladder is in the expanded configuration.

In another aspect, a guard assembly that is coupleable to a robotic arm adjacent to an end effector that selectively couples to a moveable object is provided. The guard assembly includes a plurality of guard petals selectively moveable between a retracted configuration and an extended configuration. Each guard petal includes a flexible support structure and a fluid bladder coupled to the flexible support structure. The fluid bladder is selectively filled with a fluid to change the fluid bladder between a relaxed configuration and an expanded configuration. The fluid bladder is configured to wrap the flexible support structure around at least a portion of the moveable object when the guard petal is in the extended configuration and the fluid bladder is in the expanded configuration.

In yet another aspect, a method of guarding a robotic arm assembly and a moveable object secured by the robotic arm assembly during movement of the moveable object using a guard assembly including a plurality of guard petals is provided. The method includes moving the guard petals into a retracted configuration to expose an end effector of the robotic arm assembly that is coupled to the moveable object at a source location, and, after the moveable object is coupled to the end effector, moving the guard petals to an extended configuration. The method further includes expanding a fluid bladder of each guard petal to an expanded configuration to cause a flexible support structure of each guard petal to wrap around at least a portion of the moveable object.

DETAILED DESCRIPTION

The systems and methods described herein relate generally to protection assemblies for robotic systems, and more specifically, to guard assemblies for robotic arms for enhancing safety during operation.

Described herein are exemplary embodiments of robotic systems and methods of using the robotic systems to move objects, particularly objects in an industrial assembly line environment. The robotic systems include a robotic arm assembly having a robotic arm and an end effector, and a guard assembly coupled to the robotic arm assembly. The robotic arm assembly is programmed to grab or otherwise couple to moveable objects to transport the objects from a source or origin location to a destination location. During transportation of the object, the guard assembly is deployed as a barrier around the object.

The guard assembly is moveable between an open configuration and a closed configuration to provide selective access to the end effector and to provide collision protection during transportation. In the open configuration, the end effector and any objects secured by the effector are exposed. In the closed configuration, the objects and the end effector are at least partially encapsulated by the guard assembly. In the exemplary embodiment, the guard assembly includes a plurality of flexible guard petals that are moveable between an open or retracted configuration, and closed or extended configuration. Each guard petal includes at least a fluid bladder and a support structure coupled to the fluid bladder. The fluid bladder is selectively filled with a fluid, such as water, or air, to expand or contract the bladder. When the petal is in the extended configuration, the bladder is filled with fluid and expands. As the bladder approaches an expanded configuration, the fluid pressure within the bladder causes the bladder and the support structure to curve or wrap around edges and surfaces of the object held by the end effector, thereby providing increased coverage of the object. The object is transported by the robotic arm assembly while the guard assembly is in the closed configuration. To release the object at its destination location, the guard assembly is moved to the open configuration and the end effector places the object at the destination location.

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

Figure 1:
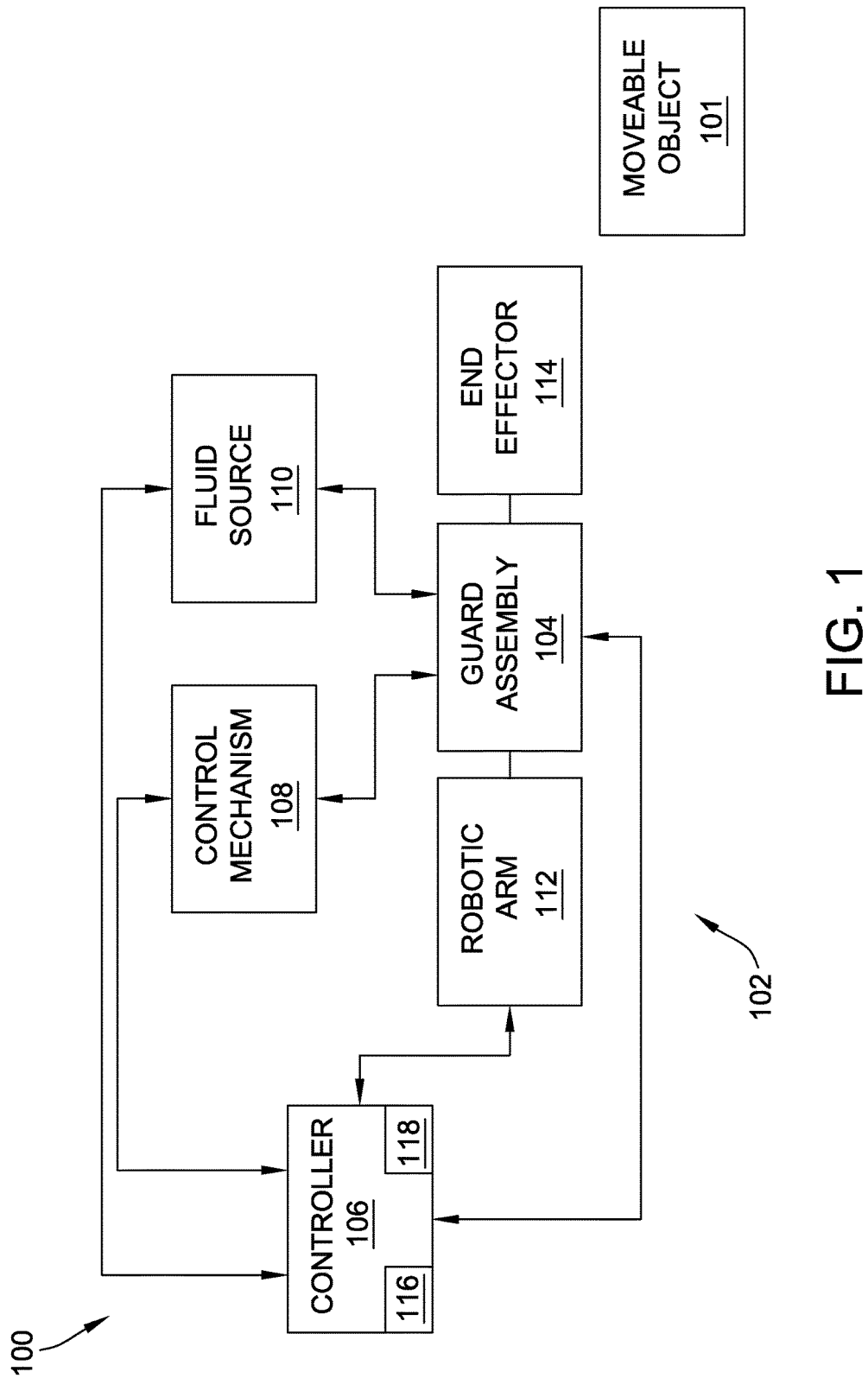
FIG. 1 is a block diagram of an exemplary robotic system including a guard assembly.

FIG. 1 is a block diagram of an exemplary robotic system 100. System 100 is configured to manipulate, move, and/or otherwise couple to a moveable object 101. Object 101 is any suitable object that can be moved by system 100. In the exemplary embodiment, system 100 is provided in an assembly line environment, and moveable object 101 is a component or apparatus that is positioned on the assembly line or is placed upon the assembly line by system 100. For example, object 101 may be a vehicle component.

In the exemplary embodiment, system 100 includes a robotic arm assembly 102, a guard assembly 104, a controller 106, a control mechanism 108, and a fluid source 110. In other embodiments, system 100 includes additional, fewer, or alternative components, including those described elsewhere herein. In some embodiments, control mechanism 108 is omitted from system 100.

Robotic arm assembly 102 includes robotic arm 112 and end effector 114. Robotic arm 112 is a structure that supports and moves end effector 114. That is, robotic arm 112 is configured to rotate, pivot, extend, and/or otherwise move to move end effector 114. In at least some embodiments, robotic arm 112 includes a plurality of arm segments that are moveably connected to each other to facilitate movement.

End effector 114 is configured to securely couple to moveable object 101. In one example, end effector 114 is a claw or gripper that couples to object 101 by gripping a portion of moveable object 101. In another example, end effector 114 includes a vacuum for gripping object 101 using vacuum forces. In other embodiments, end effector 114 is a different type of effector suitable for securely coupling to object 101. That is, different end effectors 114 may be used for different objects 101.

In at least some embodiments, robotic arm assembly 102 includes other components, such as a motor, sensors (e.g., cameras), integrated controllers, communication interfaces, and the like to facilitate the functions described herein. In the exemplary embodiment, robotic arm assembly 102 is controlled by controller 106. Controller 106 causes robotic arm 112 to move object 101 from a source location to a destination location as described herein.

In the exemplary embodiment, guard assembly 104 is selectively moveable between an open configuration and a closed configuration. Guard assembly 104 is coupled to robotic arm 112 near end effector 114, and configured to provide a barrier around end effector 114. When guard assembly 104 is in the closed configuration, guard assembly 104 at least partially encapsulates end effector 114 and any secured objects 101. In particular, guard assembly 104 covers the side edges of effector 114 and object 101 during transportation of object 101. When guard assembly 104 is in the open configuration, end effector 114 is exposed to enable effector 114 to couple to and release object 101. In the exemplary embodiment, to move object 101 from a source or origin location to a destination location, guard assembly 104 is moved to the open configuration to expose effector 114, and robotic arm 112 positions end effector 114 adjacent object 101. End effector 114 is then coupled to object 101 and guard assembly 104 is moved to the closed configuration, thereby encapsulating at least a portion of object 101 and effector 114. Robotic arm 112 moves end effector 114 near the destination location while guard assembly 104 is in the closed position. Guard assembly 104 is then moved to the open configuration to expose object 101 and end effector 114. Effector 114 then releases object 101 at the destination location.

Controller 106 is communicatively coupled to robotic arm assembly 102 and guard assembly 104 to operate both assemblies. In other embodiments, robotic arm assembly 102 and guard assembly 104 have separate controllers. Controller 106 includes at least one processor 116 and a memory device 118 communicatively coupled to processor 116. Memory device 118 stores computer-executable instructions that, when executed by processor 116, cause controller 106 to function as described herein. In the exemplary embodiment, controller 106 provides instructions to robotic arm assembly 102 and guard assembly 104 to function as described herein. For example, the computer-executable instructions may include preprogrammed instructions for robotic arm assembly 102 to move objects 101. In at least some embodiments, controller 106 is configured to receive user input to enable manual control and/or adjustment of system 100.

In the exemplary embodiment, control mechanism 108 is coupled to guard assembly 104. Control mechanism 108 is configured to move guard assembly 104 between the open and closed configurations. In some embodiments, guard assembly 104 is biased in one of the open and closed configurations, and control mechanism 108 is configured to move guard assembly 104 to the other configuration. Controller 106 is communicatively coupled to control mechanism 108 to selectively operate control mechanism 108 and thereby control the configuration of guard assembly 104. In other embodiments, control mechanism 108 is operated independently from controller 106.

In the exemplary embodiment, guard assembly 104 includes one or more fluid bladders (not shown in FIG. 1) to facilitate improved coverage of guard assembly 104 over object 101. That is, the fluid bladders are selectively filled with a fluid (e.g., air or water) to curve or wrap guard assembly 104 to conform around the edges and outer surfaces of object 101 as described herein. Fluid source 110 is fluidly coupled to the fluid bladders to expand and contract the bladders between an expanded configuration and a relaxed configuration. That is, fluid source 110 provides fluid to the fluid bladders to expand the bladders, and collects or evacuates fluid from the bladders to contract the bladders. In certain embodiments, fluid source 110 includes a vacuum or suction mechanism to evacuate fluid from the fluid bladders. In the exemplary embodiment, controller 106 is communicatively coupled to fluid source 110 to control the configuration of the bladders.

Figure 2:
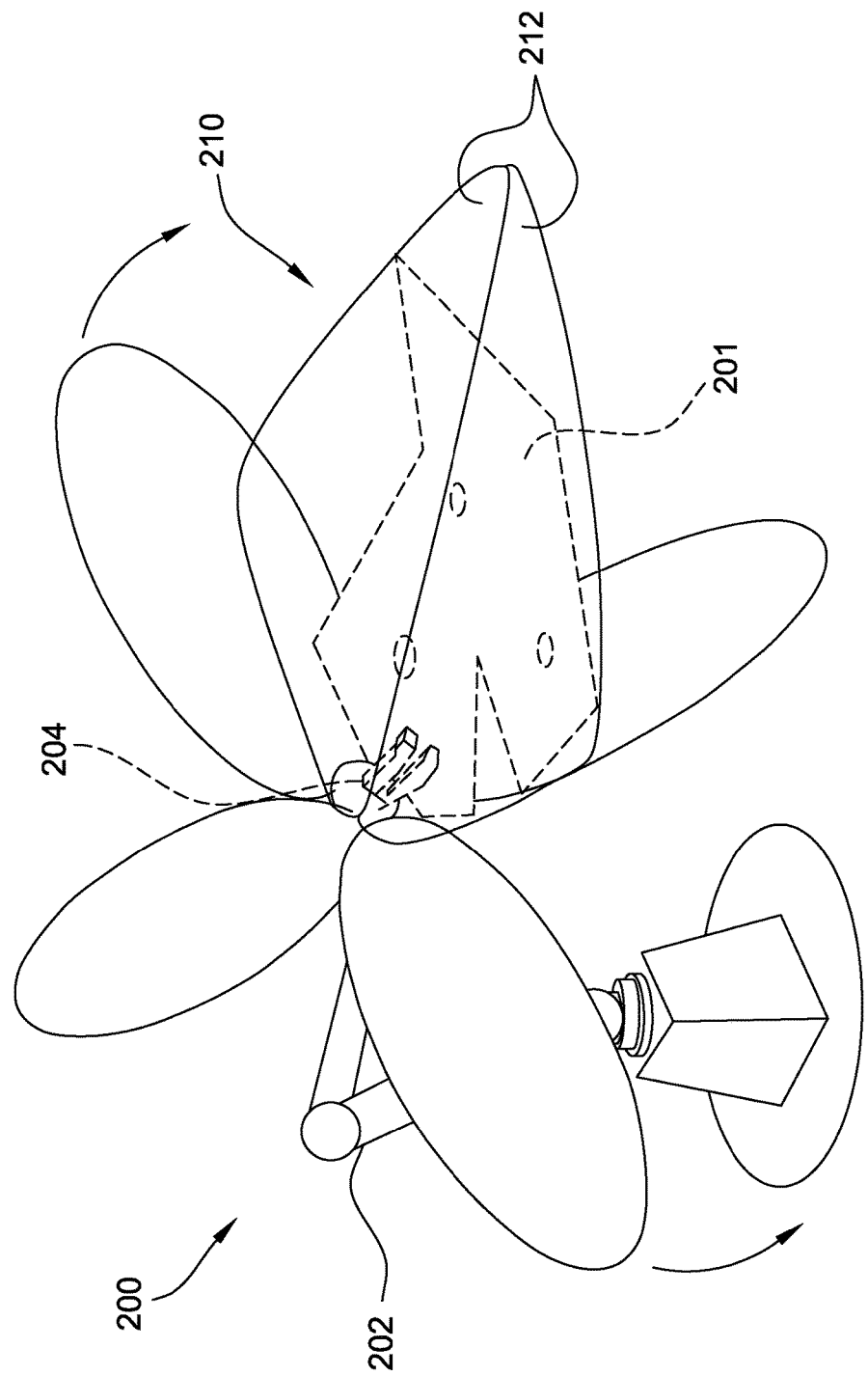
FIG. 2 is a perspective view of an exemplary robotic arm assembly and an exemplary guard assembly for use with the system shown in FIG. 1.

FIG. 2 is a perspective view of an exemplary robotic arm assembly 200 and an exemplary guard assembly 210 for use with system 100 (shown in FIG. 1). Robotic arm assembly 200 and guard assembly 210 are substantially similar to robotic arm assembly 102 and guard assembly 104 (both shown in FIG. 1) of system 100. In other embodiments, robotic arm assembly 200 and/or guard assembly 210 are different from robotic arm assembly 102 and guard assembly 104, respectively.

In the exemplary embodiment, arm assembly 200 includes a robotic arm 202 and an end effector 204. End effector 204 is coupled to a moveable object 201. In the exemplary embodiment, object 201 is a component for a vehicle.

Guard assembly 210 is positioned on robotic arm 202 proximate to end effector 204 to selectively cover effector 204 and object 201. In the exemplary embodiment, guard assembly 210 includes a plurality of moveable guard petals 212. Portions of guard assembly 210 are referred to herein as "petals" due to a similarity in appearance to flower petals and/or leaves. However, guard petals 212 may be formed in any shape or configuration that allows guard assembly 210 to function as described herein. Although four guard petals 212 are shown, guard assembly 210 may include any other suitable number of guard petals 212. In one example, guard assembly 210 includes two semi-spherical guard petals 212. In another example, guard assembly 210 includes five guard petals 212. Guard petals 212 are moveable between a closed or extended configuration and an open or retracted configuration. Guard petals 212 are sized and shaped to at least partially cover object 201 and effector 204 when positioned in the extended configuration. In at least some embodiments, guard petals 212 are moveable to any suitable number of intermediate positions between the retracted configuration and the extended configuration. Guard petals 212 are controlled either independently, in subgroups, or collectively as a whole.

Guard petals 212 are at least partially formed from a flexible material to enable guard petals 212 to wrap or curve around object 201 when in the extended configuration to cover edges and side surfaces of object 201 with petals 212. The guard petals may also be formed from a material or combination of materials that reduces or absorbs impact forces from collisions and/or is resistant to tearing caused by object 201. For example, guard petals 212 may be at least partially formed from a rubber material.

Figure 3:
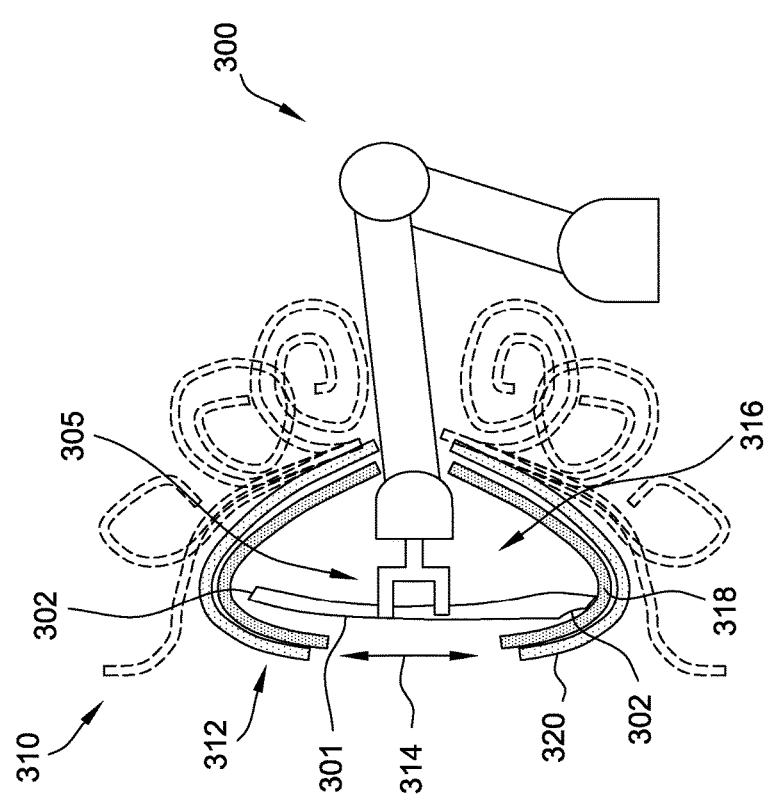
FIG. 3 is a diagram of an exemplary guard assembly moving between an open configuration and a closed configuration for use with the system shown in FIG. 1.

FIG. 3 is a diagram of an exemplary robotic arm assembly 300 coupled to a moveable object 301 and an exemplary guard assembly 310 including a plurality of guard petals 312 moving between an open or retracted configuration and a closed or extended configuration.

In the exemplary embodiment, petals 312 are flexible to enable petals 312 to bend, curve, and unfurl when moving between the retracted and extended configurations. When petals 312 are in the retracted configuration, petals 312 are furled away from an end effector 305 of robotic arm assembly 300 and object 301 to enable robotic arm assembly 300 to secure or release object 301 without interference from petals 312. When object 301 is being transferred to a destination location, guard petals 312 are transitioned to the extended configuration. Petals 312 are unrolled or unfurled to cover at least a portion of object 301. In the exemplary embodiment, petals 312 cover edges 302 of object 301. In the illustrated embodiment, the shape and size of object 301 prevents petals 312 from fully encapsulating object 301, resulting in an open gap 314 between opposing petals 312. However, the exposed area of object 301 through gap 314 is both recessed within an internal cavity 316 defined by petals 312 in the extended configuration, and does not include sharp edges.

Each petal 312 includes at least a flexible support structure 318 and a fluid bladder 320 coupled to support structure 318. Support structure 318 is configured to provide protection around object 301. Flexibility enables support structure 318 to bend, curve, and furl and unfurl when moving between the open and closed configurations. Fluid bladder 320 is configured to be selectively filled with a fluid (e.g., water or air) to expand and contract bladder 320. Expanding bladder 320 by filling bladder 320 with the fluid causes support structure 318 to curve or wrap around edge 302 when petals 312 are in the extended configuration, thereby providing additional coverage of object 301. Bladder 320 maintains support structure 318 in the curved state while bladder 320 remains expanded. To transition petals 312 to the retracted configuration, the fluid is removed from bladder 320 (e.g., via suction or pressure) and support structure 318 is rolled up or furled as described herein.

Figure 4:
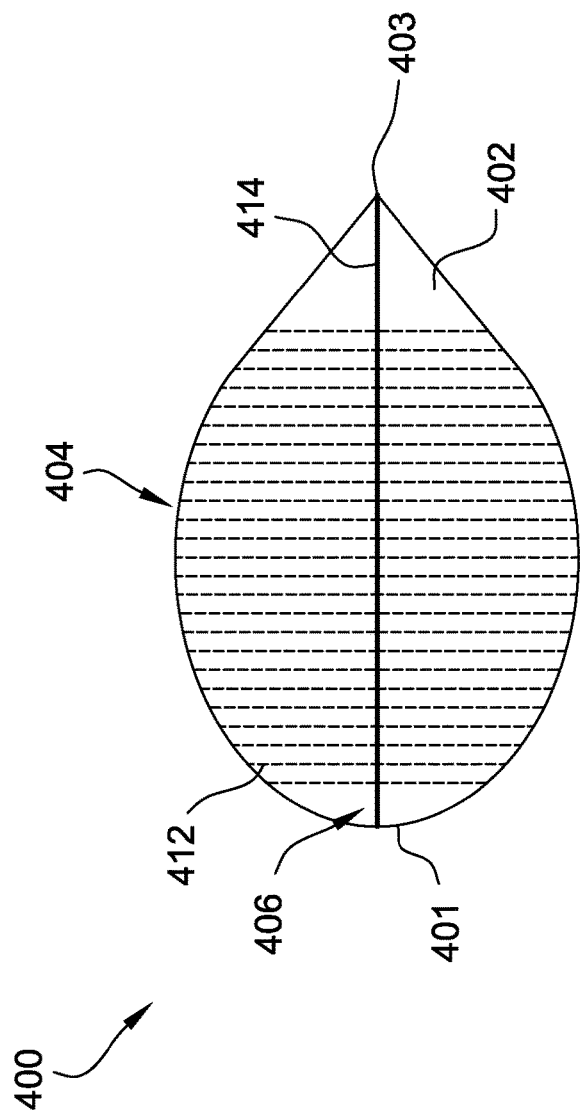
FIG. 4 is a top plan view of an exemplary guard petal for use with the system shown in FIG. 1.
Figure 5:
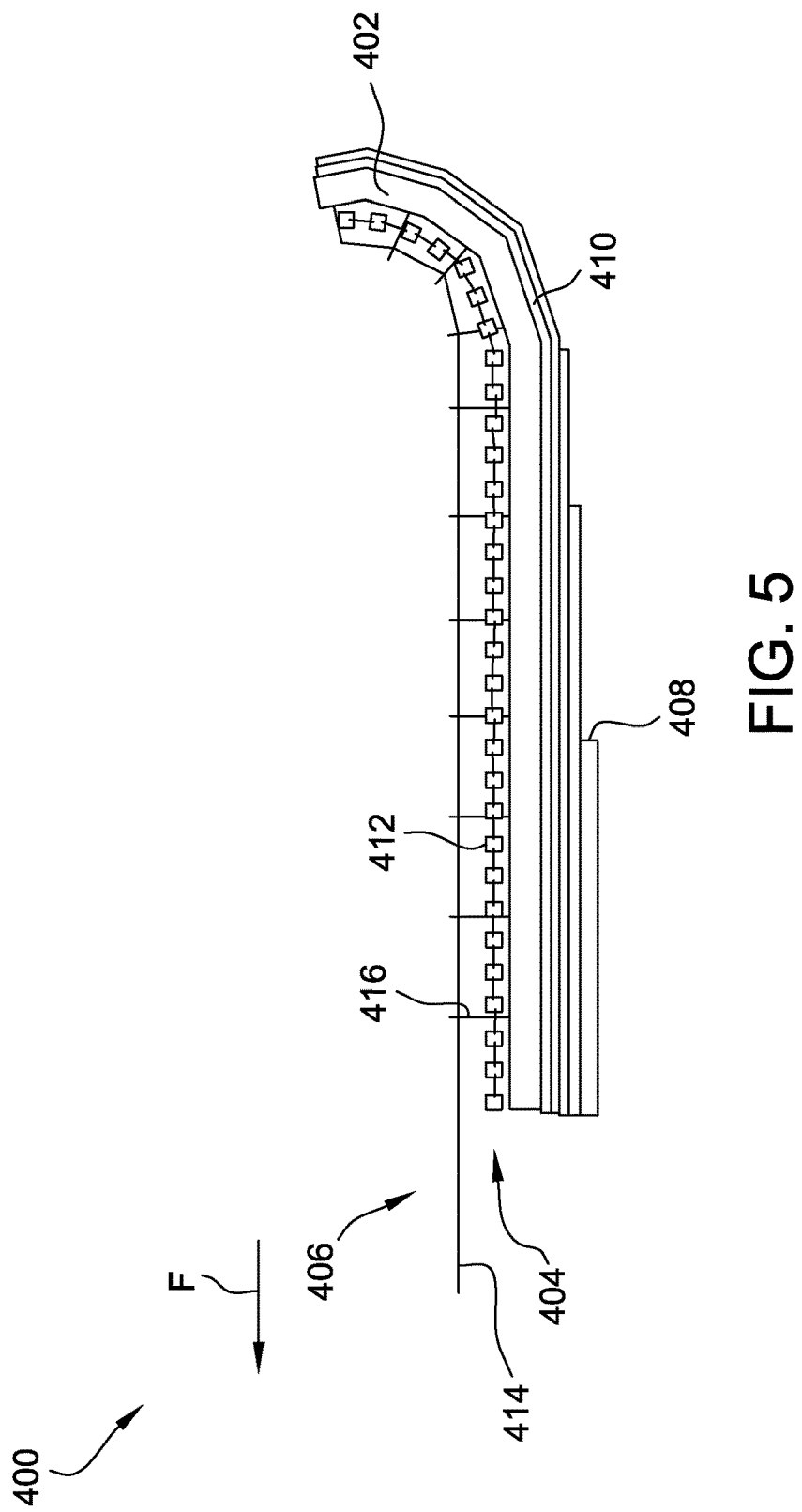
FIG. 5 is a side view of the exemplary guard petal shown in FIG. 4.
Figure 6:
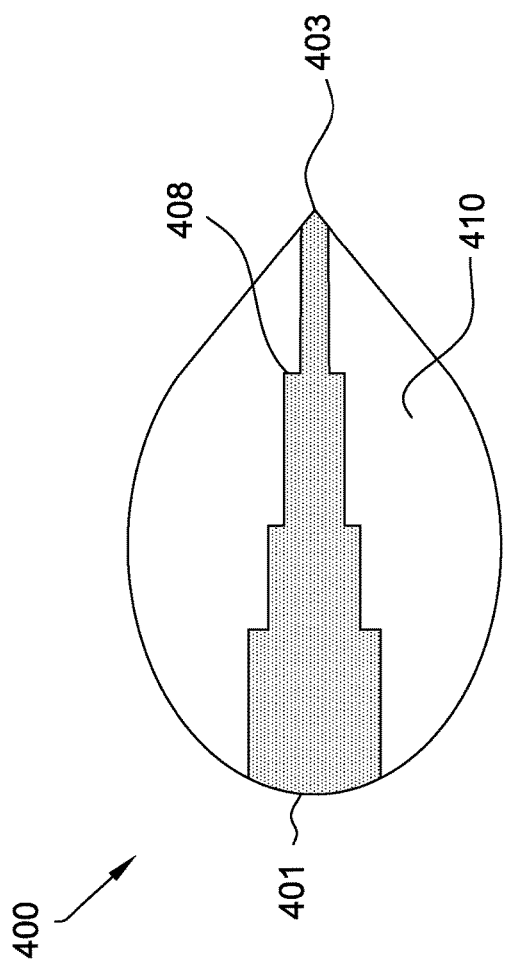
FIG. 6 is a bottom plan view of the exemplary guard petal shown in FIG. 4.

FIGS. 4-6 depict an exemplary guard petal 400 for use with system 100 (shown in FIG. 1). More specifically, FIG. 4 is a top plan view of petal 400, FIG. 5 is a side view of petal 400, and FIG. 6 is a bottom plan view of petal 400. The bottom of petal 400 faces an end effector and moveable object when petal 400 is in the extended configuration, while the top of petal 400 faces away from the object when in the extended configuration. In the exemplary embodiment, a proximal end 401 of petal 400 is positioned adjacent to an end effector and robotic arm of a corresponding robotic arm assembly, and a distal end 403 of petal 400 is positioned away from the end effector and robotic arm when petal 400 is in the extended configuration.

With respect to FIGS. 4-6, petal 400 includes a support structure 402, a fluid bladder 404, a tendon structure 406, a spring mechanism 408 (shown in FIGS. 5 and 6), and a stretch-resistant substrate 410 (shown in FIGS. 5 and 6). Support structure 402 is formed from a flexible material or combination of materials that is manipulated into moving using bladder 404, tendon structure 406, spring mechanism 408, and stretch-resistant substrate 410. In at least some embodiments, support structure 402 is configured to be rolled up or furled as described herein. Support structure 402 is also configured to resist tearing caused by sharp edges of a moveable object and/or reduce impact forces caused by a collision involving petal 400. In one example, support structure 402 is formed from a rubber material. In other embodiments, support structure 402 is formed from a different suitable material.

Fluid bladder 404 is an expandable bladder that is selectively filled with one or more fluids to control the size of bladder 404. Fluid bladder 404 is formed from any suitable material or combination of materials that enable fluid bladder 404 to be flexible, resistant to tearing, and/or sealed to prevent leaks. In the exemplary embodiment, fluid bladder 404 includes a plurality of interconnected fluid sacks 412. Fluid sacks 412 are in fluid communication with each other to distribute the fluid throughout the surface area of support structure 402. In the exemplary embodiment, fluid sacks 412 are positioned proximate to each other such that fully expanded adjacent fluid sacks 412 contact each other. To alleviate the pressure caused by the contact of adjacent fluid sacks 412, bladder 404 curves or bends downwardly (i.e., toward a moveable object secured by an end effector) into a concave shape, and causes support structure 402 to also curve or bend. Removing fluid from fluid sacks 412 causes fluid bladder 404 to contract, and enables support structure 402 to be moved to the retracted configuration. That is, when petal 400 is in the retracted configuration, fluid bladder 404 is in or is substantially near the contracted configuration.

Tendon structure 406 is configured to move petal 400 from the extended configuration to the retracted configuration. In particular, tendon structure 406 is coupled to support structure 402 and selectively moves support structure 402. In other embodiments, tendon structure 406 is coupled to a different part of petal 400. In the exemplary embodiment, tendon structure 406 includes a tendon 414 and a plurality of tendon anchors 416. Tendon 414 is formed from any suitable materials or combination of materials, such as a metal cable or a nylon cable. Tendon anchors 416 are formed from a plastic material or a different suitable material. Tendon 414 extends across a center axis of support structure 402. Tendon anchors 416 are coupled between tendon 414 and support structure 402 to facilitate movement of support structure 402 by manipulating tendon 414.

In the exemplary embodiment, a tensile force F as shown in FIG. 5 is applied to tendon 414 (e.g., by control mechanism 108, shown in FIG. 1) to transition petal 400 from the extended configuration to the retracted configuration. Tendon anchors 416 are spaced apart from each other to define a plurality of pivot points to cause petal 400 to roll up or furl when the tensile force F is applied to tendon 414. In the exemplary embodiment, at least a portion of the tensile force F is maintained on tendon 414 when petal 400 is in the retracted configuration to prevent petal 400 from moving towards the extended configuration. In other embodiments, tendon structure 406 has a different configuration and/or includes different tendons 414 and/or tendon anchors 416. In one example, tendon structure 406 includes another tendon 414 and tendon anchors 416 on the bottom of petal 400 to facilitate additional control of the curvature of petal 400 in the extended configuration. In another example, multiple tendons 414 are coupled to support structure 402 on the same side of structure 402.

In the exemplary embodiment, spring mechanism 408 is configured to bias petal 400 toward the extended configuration. That is, the resting or relaxed state of spring mechanism 408 is in the extended configuration, and spring mechanism 408 applies a biasing force to petal 400 when petal 400 is out of the extended configuration. Spring mechanism 408 is formed from a flexible material or combination of materials that enable spring mechanism to apply the biasing force while petal 400 is in a state other than the extended configuration (e.g., the retracted configuration). In at least some embodiments, spring mechanism 408 is a leaf spring having a plurality of segments. In other embodiments, spring mechanism 408 is a different type of spring or biasing member.

Stretch-resistant substrate 410 is coupled between support structure 402 and spring mechanism 408. Substrate 410 is formed from a material or combination of materials that provide protection from collisions, resistance to tearing, and/or stretch resistance. In at least some embodiments, substrate 410 is formed from a synthetic fiber material, such as Kevlar® fiber (Kevlar® is a registered trademark of DuPont, located in Wilmington, Del.). In other embodiments, substrate 410 is formed from a different material. The stretch resistance of substrate 410 increases the curvature of petal 400 in the extended configuration when bladder 404 is expanded to an expanded configuration. That is, substrate 410 prevents petal 400 from stretching to alleviate the relatively high fluid pressure from bladder 404, and thus petal 400 bends or curves to alleviate the fluid pressure.

Although petal 400 is shown in one configuration of support structure 402, bladder 404, tendon structure 406, spring mechanism 408, and substrate 410, in other embodiments, petal 400 has a different configuration such that different components are coupled together in different orientations, the components have a different size, shape, and/or structure, and/or additional, fewer, or alternative components are included in petal 400, including those described elsewhere herein.

FIGS. 7-13 depict various stages of an exemplary operation process performed by a robotic system 700 for moving a moveable object 701 from a source location 703 to a destination location 705. In particular, moveable object 701 is a wheel for a vehicle being assembled on an assembly line. System 700 is substantially similar to system 100 (shown in FIG. 1), and includes a robotic arm 702, an end effector 704, and a guard assembly 706. Guard assembly 706 includes a plurality of guard petals 708. A portion of the plurality of guard petals are not shown for illustrative purposes only.

Figure 7:
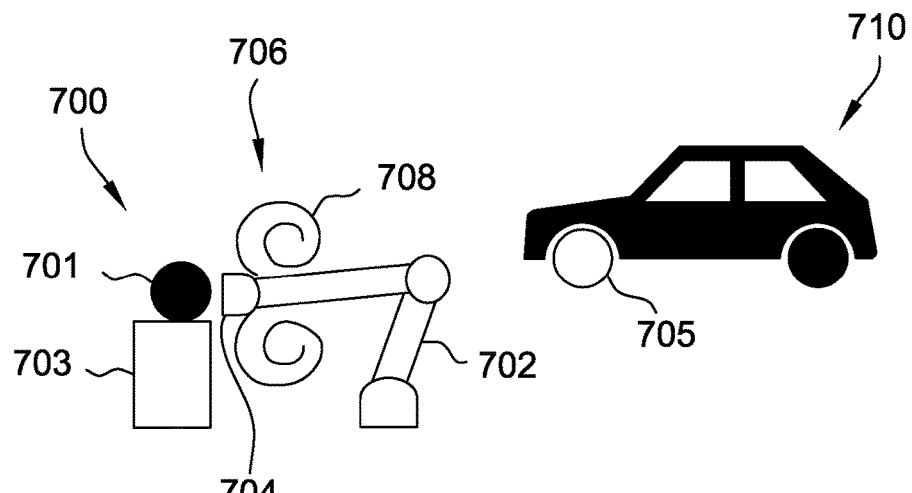
FIG. 7 is a diagram of a first stage of an exemplary operation process for a robotic arm with a guard assembly for use with the system shown in FIG. 1.

At a first stage 710 shown in FIG. 7, wheel 701 is located at source or origin location 703. In the exemplary embodiment, source location 703 is positioned away from the assembly line. Destination location 705 is at the vehicle on the assembly line. To transfer wheel 701 to destination location 705, robotic arm 702 positions end effector 704 adjacent wheel 701. Guard petals 708 are in the open or retracted configuration to enable end effector 704 to couple to wheel 701 without interference from guard assembly 706. In the exemplary embodiment, petals 708 are rolled up or furled when in the retracted configuration. End effector 704 then couples to wheel 701, and arm 702 moves away from source location 703.

Figure 8:
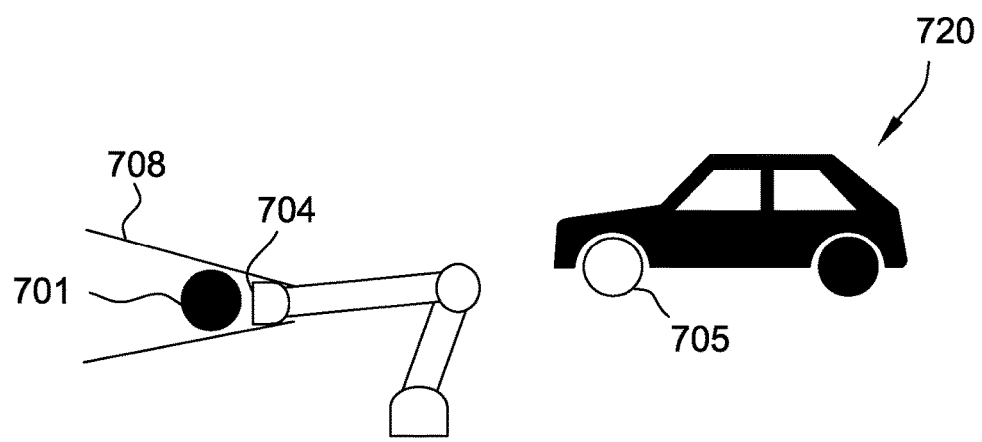
FIG. 8 is a diagram of a second stage of an exemplary operation process for a robotic arm with a guard assembly for use with the system shown in FIG. 1.

At a second stage 720 shown in FIG. 8, guard petals 708 are moved from the retracted configuration towards the extended configuration. In at least some embodiments, a spring mechanism (not shown in FIG. 8) of each petal 708 biases petals 708 towards the extended configuration. In the exemplary embodiment, end effector 704 is still near source location 703 (shown in FIG. 7) during second stage 720.

Figure 9:
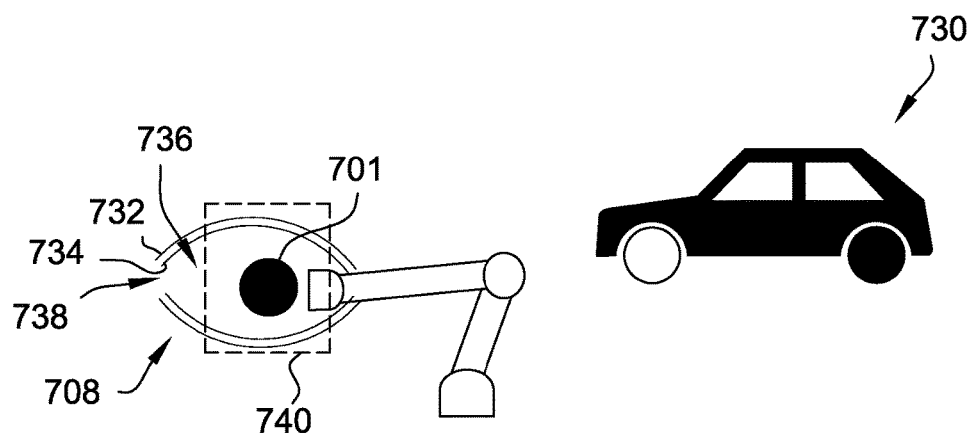
FIG. 9 is a diagram of a third stage of an exemplary operation process for a robotic arm with a guard assembly for use with the system shown in FIG. 1.

At a third stage 730 shown in FIG. 9, a fluid bladder 732 of each guard petal 708 is filled with fluid to expand bladder 732 to the expanded configuration. The expanded bladder causes a support structure 734 of each petal 708 to curve or wrap around wheel 701 and define an internal chamber 736. Depending on the size and shape of wheel 701 (or other moveable objects) and petals 708, wheel 701 may be fully encapsulated within chamber 736 or partially encapsulated such that a gap 738 is defined between distal ends of guard petals 708.

Figure 10:
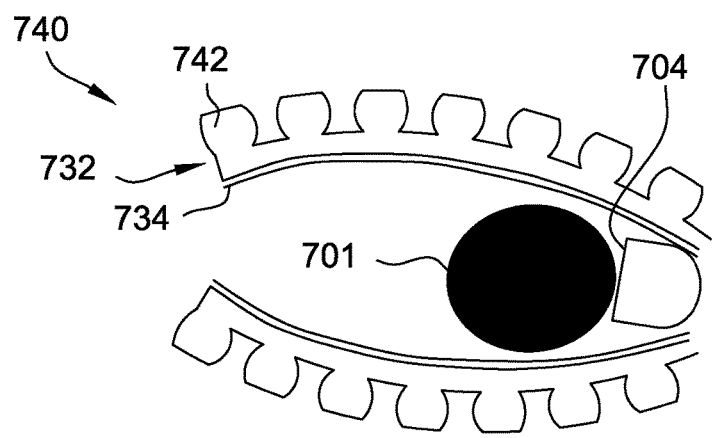
FIG. 10 is a diagram of the exemplary guard assembly shown in FIG. 9 having an expanded fluid bladder.

FIG. 10 is an enlarged view of a portion 740 (shown in FIG. 9) of guard assembly 706 in the closed configuration. In the exemplary embodiment, fluid bladder 732 is being filled with fluid and is approaching the expanded configuration. A plurality of fluid sacks 742 of bladder 732 expand as a result of the fluid and the corresponding fluid pressure. As the fluid pressure increases, adjacent fluid sacks 742 engage each other, causing fluid bladder 732 and support structure 734 to curve or wrap around wheel 701 and end effector 704. Bladder 732 and support structure 734 remain curved until fluid is removed from fluid bladder 732.

Figure 11:
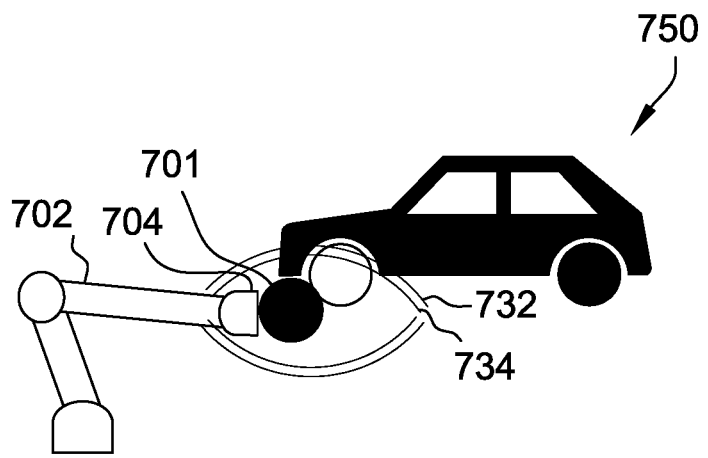
FIG. 11 is a diagram of a fourth stage of an exemplary operation process for a robotic arm with a guard assembly for use with the system shown in FIG. 1.

At a fourth stage 750 of the exemplary operation process shown in FIG. 11, robotic arm 702 moves wheel 701 and end effector 704 near destination location 705 (FIG. 12) to an intermediate location. In the exemplary embodiment, robotic arm 702 is configured to rotate to move wheel 701 to the intermediate location. During the movement between third stage 730 (shown in FIG. 9) and fourth stage 750, bladder 732 remains in the expanded configuration to maintain support structure 734 wrapped around wheel 701.

Figure 12:
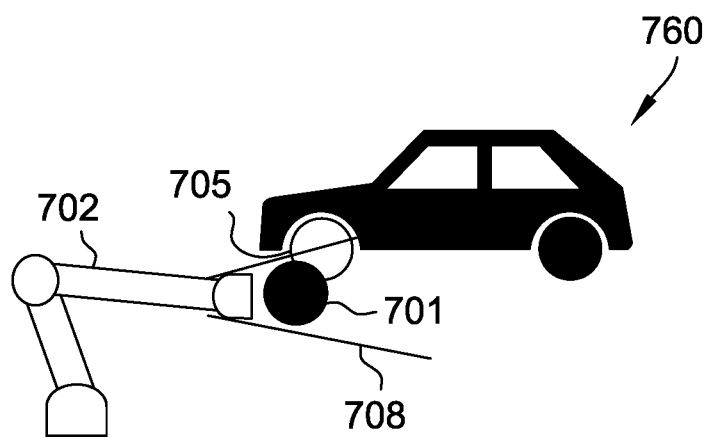
FIG. 12 is a diagram of a fifth stage of an exemplary operation process for a robotic arm with a guard assembly for use with the system shown in FIG. 1.
Figure 13:
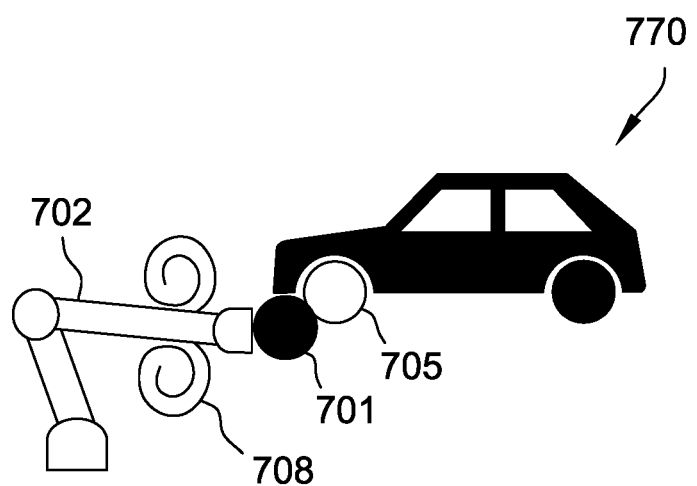
FIG. 13 is a diagram of a sixth stage of an exemplary operation process for a robotic arm with a guard assembly for use with the system shown in FIG. 1.

At a fifth stage 760 shown in FIG. 12, fluid is removed from bladder 732 to contract or deflate bladder 732. Support structure 734 straightens out to enable petal 708 to be moved to the extended configuration. At a sixth stage 770 shown in FIG. 13, petals 708 are moved to the retracted configuration to expose end effector 704 and wheel 701. In at least some embodiments, a tendon structure (not shown in FIG. 13) of each petal 708 is used to move petals 708 from the extended configuration to the retracted configuration by rolling up or furling petals 708. After end effector 704 and wheel 701 are exposed, robotic arm 702 positions end effector 704 adjacent to destination location 705 to release wheel 701. In some embodiments, end effector 704 is configured to perform additional tasks at destination location 705, such as coupling wheel 701 to a corresponding structure, securing fasteners (e.g., screws, bolts, nuts, etc.) to wheel 701, and the like. After releasing wheel 701 at destination location 705, robotic arm 702 moves end effector 704 back towards source location 703 to retrieve a second wheel 701 to repeat the operation process. In some embodiments, when moving end effector 704 to source location 703, guard petals 708 may be deployed in the extended or closed configuration until end effector 704 is located at its destination.

The foregoing systems and methods facilitate increased safety of robotic systems operated without the use of fences and/or robot cages by providing a selectively deployable guard assembly. The guard assembly covers at least a portion of moveable objects (particularly edges of the objects) being transported by the robotic system. The components of the guard assembly are flexible to enable the guard assembly to curve and conform to the edges and surfaces of the objects being moved. Additionally, the flexibility of the guard assembly enables the guard assembly to be rolled up away from the end effector of the robotic arm assembly to limit interference in the operation of the robotic arm assembly by the guard assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A robotic system comprising:
a robotic arm assembly comprising a robotic arm and an end effector coupled to said robotic arm, wherein said end effector is configured to selectively couple to a moveable object;
a guard assembly that is selectively moveable between an open configuration and a closed configuration and comprising a plurality of guard petals, each guard petal of said plurality of guard petals selectively moveable between a retracted configuration and an extended configuration and comprising:
a flexible support structure; and
a fluid bladder coupled to said flexible support structure, wherein said fluid bladder is selectively filled with a fluid to change said fluid bladder between a relaxed configuration and an expanded configuration, wherein said fluid bladder is configured to wrap said flexible support structure around at least a portion of the moveable object when said guard petal is in the extended configuration and said fluid bladder is in the expanded configuration.

2. The robotic system of claim 1, wherein the end effector includes the guard assembly.

3. The robotic system of claim 1 further comprising a controller communicatively coupled to said guard assembly, wherein said controller is configured to move said guard assembly between the open configuration and the closed configuration using a control mechanism coupled to said guard assembly.

4. The robotic system of claim 3, wherein said each guard petal further comprises a tendon structure coupled to said flexible support structure and said control mechanism, wherein said controller is configured to apply a tensile force to said tendon structure using said control mechanism to move said guard petal to the extended configuration.

5. The robotic system of claim 4, wherein said tendon structure is configured to furl said guard petal to move said guard petal to the retracted configuration.

6. The robotic system of claim 1 further comprising a fluid source coupled in fluid communication with said fluid bladder to selectively provide fluid to said fluid bladder and expand said fluid bladder to the expanded configuration.

7. The robotic system of claim 6, wherein said fluid source is configured to at least partially evacuate fluid from said fluid bladder to contract said fluid bladder into the relaxed configuration.

8. The robotic system of claim 1, wherein said each guard petal further comprises a stretch-resistant substrate coupled to said flexible support structure, wherein said stretch-resistant substrate is configured wrap around the moveable object in response to said fluid bladder expanding into the expanded configuration.

9. A guard assembly configured to be coupled to a robotic arm adjacent to an end effector of the robotic arm, wherein the end effector is selectively coupled to a moveable object, said guard assembly comprising:
a plurality of guard petals selectively moveable between a retracted configuration and an extended configuration, wherein each of said plurality of guard petals comprises:

a flexible support structure; and a fluid bladder coupled to said flexible support structure and wherein said fluid bladder is selectively filled with a fluid to change said fluid bladder between a relaxed configuration and an expanded configuration, wherein said fluid bladder is configured to wrap said flexible support structure around at least a portion of the moveable object when said guard petal is in the extended configuration and said fluid bladder is in the expanded configuration;

wherein each said guard petal furls away from said end effector when in the retracted configuration to expose said end effector.

10. The guard assembly of claim 9, wherein said each guard petal further comprises a tendon structure coupled to said flexible support structure and configured to selectively move said guard petal between the extended configuration and the retracted configuration.

11. The guard assembly of claim 10, wherein said tendon structure comprises a tendon and a plurality of tendon anchors coupled between said flexible support structure and said tendon.

12. The guard assembly of claim 9, wherein said fluid bladder comprises a plurality of fluid sacks, wherein each fluid sack of said plurality of fluid sacks is configured to engage adjacent fluid sacks when filled with the fluid to cause said flexible support structure to wrap around at least a portion of the moveable object.

13. The guard assembly of claim 9, wherein said each guard petal further comprises a spring mechanism coupled to at least one of said flexible support structure and said fluid bladder, said spring mechanism configured to bias said guard petal in the extended configuration.

14. A method of guarding a robotic arm assembly and a moveable object secured by the robotic arm assembly during movement of the moveable object using a guard assembly comprising a plurality of guard petals, said method comprising:

moving each of the plurality of guard petals into a retracted configuration to expose an end effector of the robotic arm assembly, wherein the end effector is coupled to the moveable object at a source location;

after the moveable object is coupled to the end effector, moving each of the plurality of guard petals to an extended configuration; and expanding a fluid bladder of each guard petal of the plurality of guard petals to an expanded configuration to cause a flexible support structure of the each guard petal to wrap around at least a portion of the moveable object.

15. The method of claim 14 further comprising:

contracting the fluid bladder of the each guard petal to a relaxed configuration when the moveable object is moved to a second location by the robotic arm assembly; and moving, when the fluid bladder is in the relaxed configuration, the plurality of guard petals into the retracted configuration to expose the end effector and the moveable object.

16. The method of claim 14, wherein moving each of the plurality of guard petals to the retracted configuration further comprises applying a tensile force to a tendon of the each guard petal.

17. The method of claim 16, wherein the tensile force applied to the tendon causes the flexible support structure of the each guard petal to furl into the retracted configuration.

18. The method of claim 16, wherein moving each of the plurality of guard petals to the extended configuration further comprises:

releasing the tensile force from the tendon of the each guard petal; and biasing, using a spring mechanism, the flexible support structure of the each guard petal toward the extended configuration.

19. The method of claim 14, wherein expanding the fluid bladder further comprises expanding a plurality of fluid sacks of the fluid bladder, wherein adjacent fluid sacks of the plurality of fluid sacks engage each other to cause the flexible support structure to wrap around at least a portion of the moveable object.

* * * * *